United States Patent
Li

(10) Patent No.: US 9,015,990 B2
(45) Date of Patent: Apr. 28, 2015

(54) CULTURE CONTAINER

(71) Applicant: Bing-Mao Li, Taichung (TW)

(72) Inventor: Bing-Mao Li, Taichung (TW)

( * ) Notice: Subject to any disclaimer, the term of this patent is extended or adjusted under 35 U.S.C. 154(b) by 0 days.

(21) Appl. No.: 13/895,338

(22) Filed: May 15, 2013

(65) Prior Publication Data

US 2014/0007500 A1    Jan. 9, 2014

(30) Foreign Application Priority Data

Jul. 6, 2012 (TW) .............................. 101213062 U

(51) Int. Cl.
*A01G 9/02* (2006.01)
*A01G 9/10* (2006.01)

(52) U.S. Cl.
CPC ... *A01G 9/02* (2013.01); *A01G 9/10* (2013.01)

(58) Field of Classification Search
CPC ............ A01G 9/02; A01G 9/028; A01G 9/10
USPC ........ 47/86, 29.1, 29.2, 29.53, 31.1; 220/745, 220/913, 661, 662, 669
See application file for complete search history.

(56) References Cited

U.S. PATENT DOCUMENTS

| 1,415,134 | A | * | 5/1922 | Williams | ........................ 43/108 |
| 5,005,717 | A | * | 4/1991 | Oilar | ............................ 215/13.1 |
| 6,202,871 | B1 | * | 3/2001 | Kelly | ............................ 215/307 |
| 2007/0251913 | A1 | * | 11/2007 | Mengeu | ........................ 215/308 |

* cited by examiner

*Primary Examiner* — Rob Swiatek
*Assistant Examiner* — Ebony Evans

(57) ABSTRACT

A culture container includes a container and a cover. The container forms an opening at the top and an external threaded portion around the opening. The cover includes a main body and a flange extending from the main body. An internal threaded portion corresponding to the external threaded portion is formed on the internal surface of the flange. The cover forms a ventilation passage having an opening formed at a free end of the flange facing away from the main body. When the internal threaded portion is threaded with the external threaded portion so as to close the opening of the bottle, the interior of the bottle communicates with exterior via the ventilation passage. Thus, dust is prevented from falling into the bottle via the ventilation passage.

4 Claims, 5 Drawing Sheets

CULTURE CONTAINER

BACKGROUND OF THE INVENTION

1. Field of the Invention

The present invention relates to a culture container.

2. Description of the Prior Art

When developing plant seedlings, as shown in FIG. 5, a container 9 receiving culture media is usually utilized. The container 9 includes a bottle 91 with a cover 92 screwed with the bottle 91. The cover 92 forms a ventilation hole 921 at the top, and a membrane 922 is disposed on the ventilation hole 921 for blocking dust from entering the bottle 91. However, the membrane 922 may be blocked by falling dust so that the membrane 922 has to be displaced. Thus, cost is increased. Also, when the membrane 922 is blocked by dust, ventilation efficiency of the ventilation hole 921 is decreased. On the other hand, the cover 92 has only one ventilation hole 921. As a result, convection of the ventilation hole 921 is deficient.

SUMMARY OF THE INVENTION

The main object of the present invention is to provide a culture container which is able to prevent dust from entering via the ventilation passage and to prevent the ventilation passage from being blocked.

To achieve the above and other objects, a culture container of the present invention includes a container and a cover.

The container forms a receiving space and an opening at a top of the container wherein the opening communicates with the receiving space. An external threaded portion is formed on an external surface of the container near the top wherein the external threaded portion is arranged around the opening. The cover includes a main body and a flange extending from the main body. A covering space is enclosed and defined by the main body and the flange. An internal threaded portion is formed on an internal surface of the flange wherein the internal threaded portion corresponds to the external threaded portion of the container. The cover is screwed with the container by the internal threaded portion and the external threaded portion so as to close the opening of the container. The cover forms a ventilation passage having a first opening and a second opening. The first opening faces the covering space, and the second opening is formed on a free end of the flange facing away from the main body. When the internal threaded portion is screwed with the external threaded portion, the receiving space communicates with external space via the ventilation passage.

In conclusion, the ventilation passage has an outward opening which faces downward so that dust in the air is prevented from falling into the container via the ventilation passage. In addition, membrane for blocking dust outside is not necessary anymore, and the ventilation passage is prevented from being blocked so as to promote ventilation efficiency.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
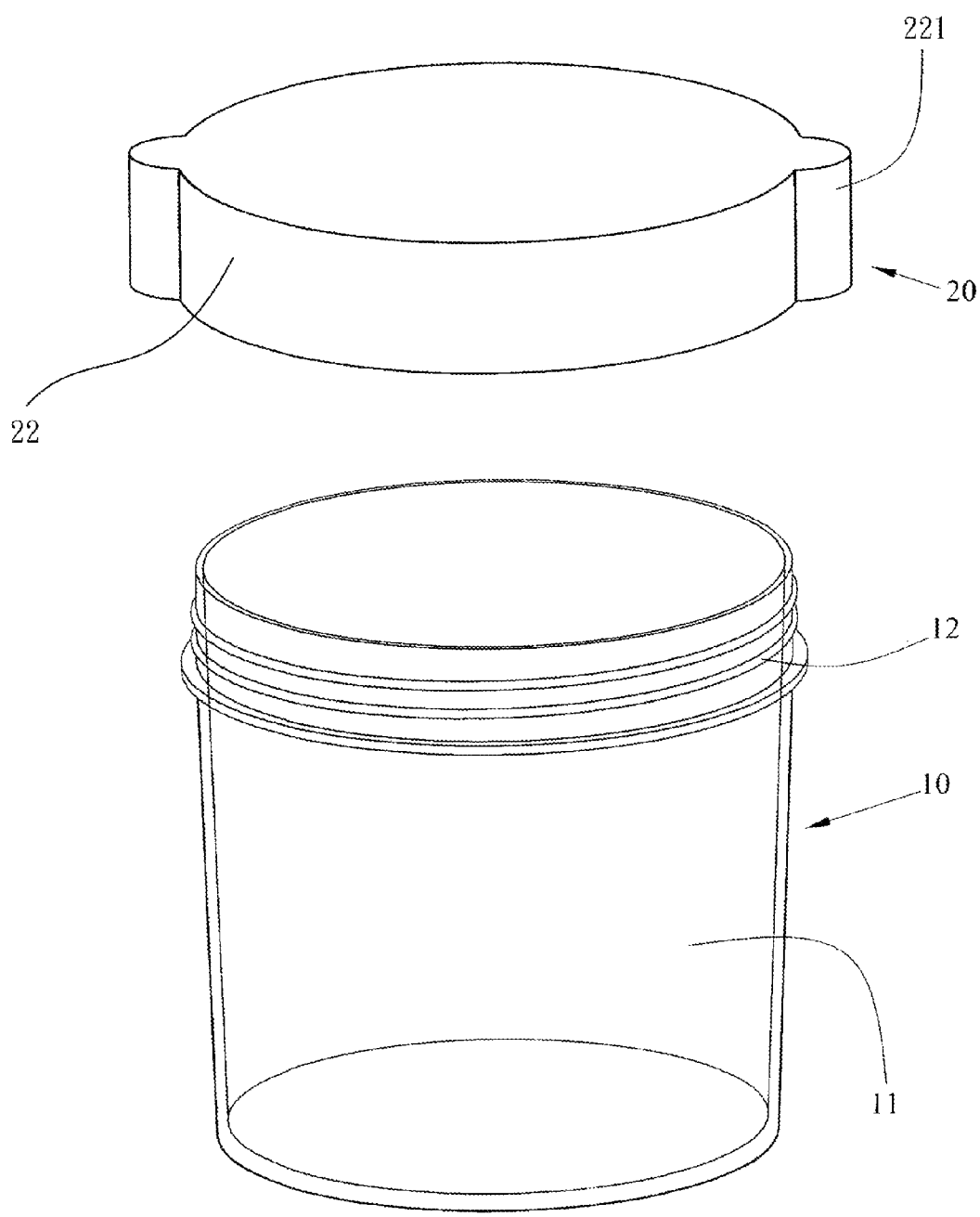
FIG. 1 is a breakdown drawing showing a first embodiment of the present invention.

Please refer to FIG. 1 to FIG. 4. The culture container of the present invention includes a container 10 and a cover 20.

The container 10 forms a receiving space 11. The container 10 further forms an opening communicating with the receiving space 11 at a top of the container 10. An external threaded portion 12 is formed on an external surface of the container 10 near the top wherein the external threaded portion 12 is arranged around the opening. Preferably, the container 10 is transparent. The cover 20 includes a main body and a flange 22 extending from the main body. A covering space 24 is enclosed and defined by the main body and the flange 22. An internal threaded portion 21 corresponding to the external threaded portion 12 is formed on an internal surface of the flange 22. The cover 20 is screwed with the container 20 by the internal threaded portion 21 and the external threaded portion 12 so as to close the opening of the container 20. The cover 20 further forms a ventilation passage 23 having a first opening 231 and a second opening 232 which are located at two opposite ends of the ventilation passage 23. The first opening 231 faces the covering space 24 and is located between the main body and the internal threaded portion 21. That is, the first opening 231 is located above the internal threaded portion 21. The second opening 232 is formed on a free end of the flange 22 facing away from the main body. The flange 22 is formed with a blocking flange 25 inside the covering space 24. The blocking flange 25 extends downward a predetermined length to form a gap between the blocking flange 25 and the flange 22. When the internal threaded portion 21 is screwed with the external threaded portion 12, a top portion of a wall of the container 10 is clamped between the flange 22 and the blocking flange 25 to be abutted against by the blocking flange 25, and the receiving space 11 communicates with external space via the ventilation passage 23. Preferably, the cover 20 is transparent.

Figure 2:
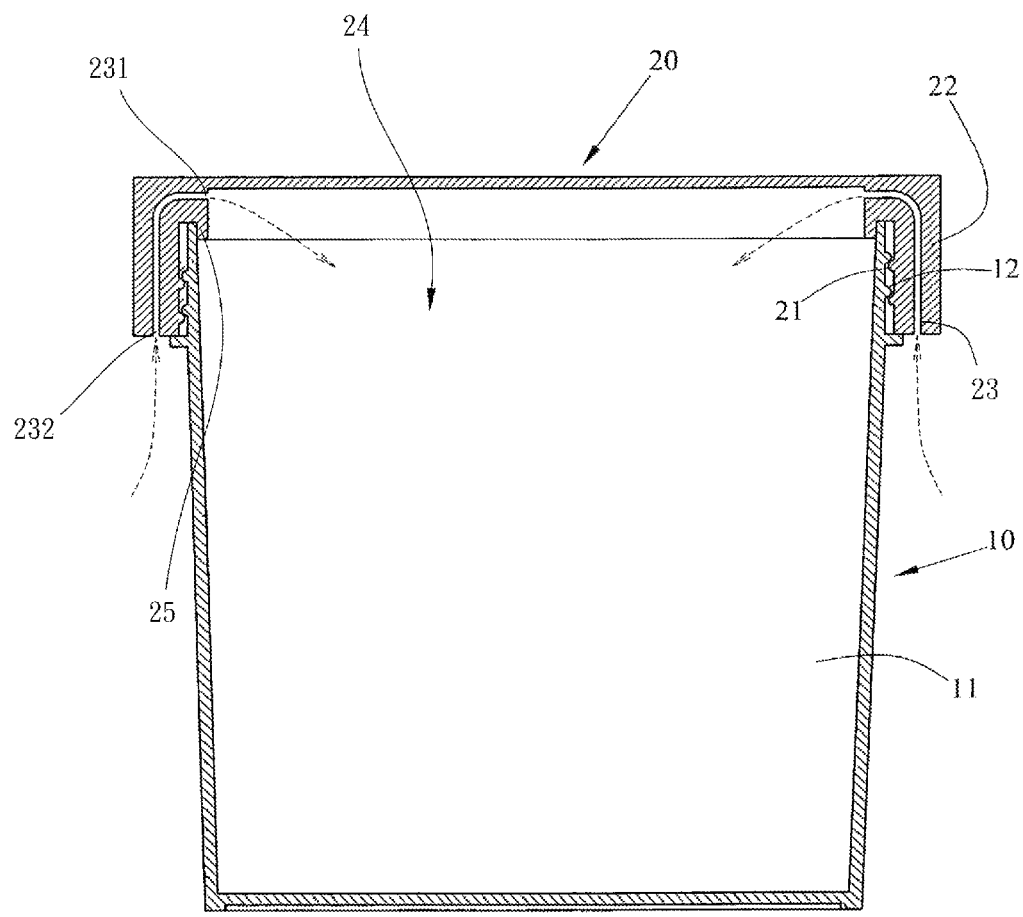
FIG. 2 is a cross-section drawing showing a first embodiment of the present invention.
Figure 3:
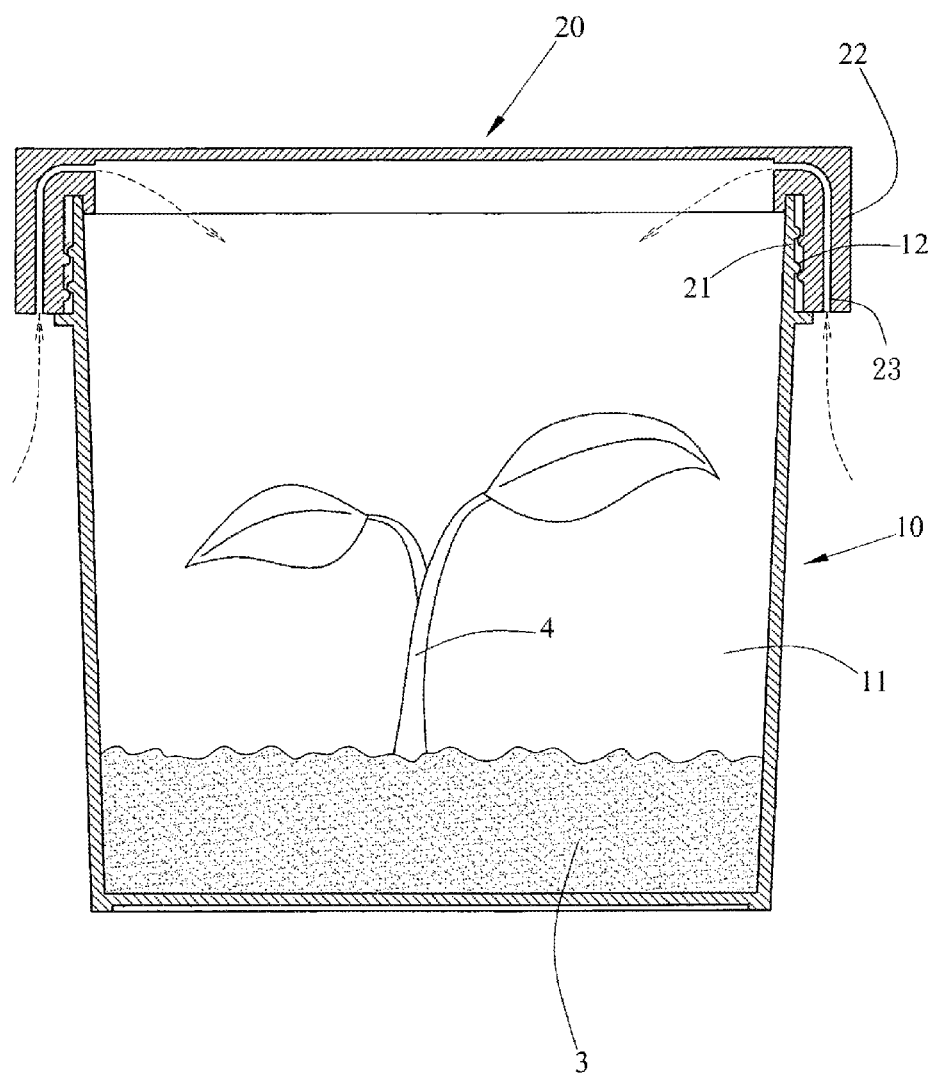
FIG. 3 is an illustration of using showing a first embodiment of the present invention.
Figure 4:
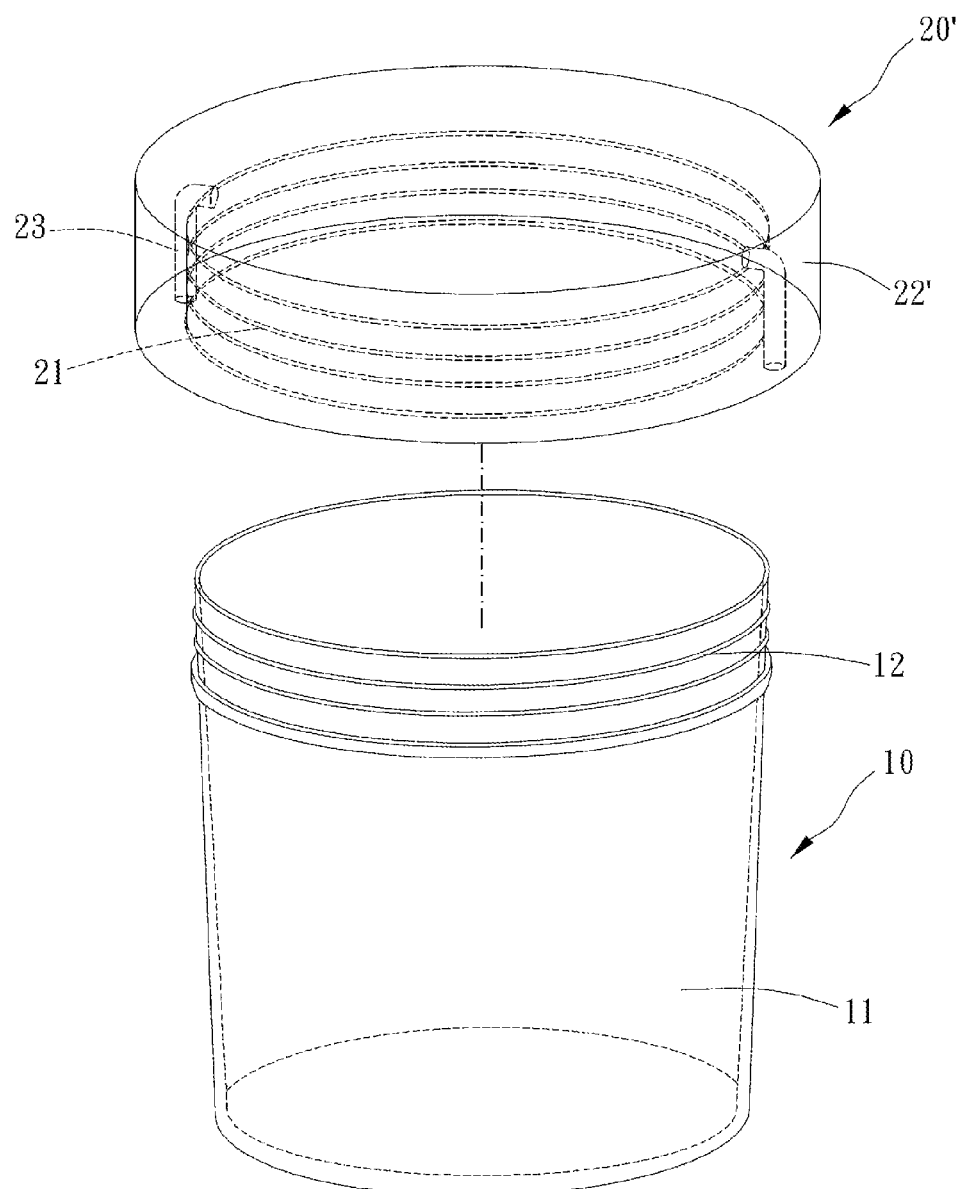
FIG. 4 is a breakdown drawing showing a second embodiment of the present invention.
Figure 5:
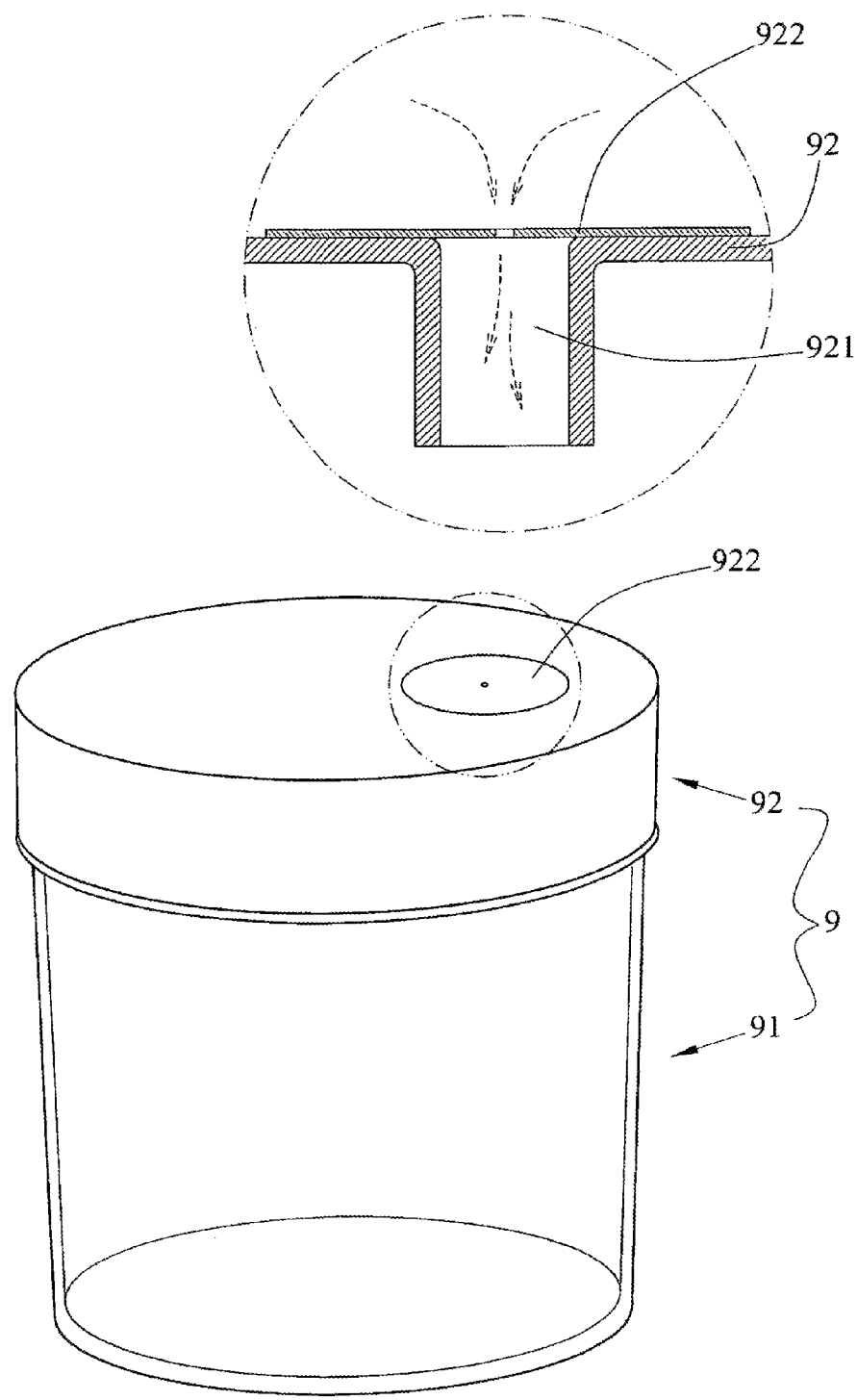
FIG. 5 is an illustration showing a culture container of prior arts.

In the present embodiment, as shown in FIGS. 1 to 3, the flange 22 has at least one thickened portion 221 having a larger thickness than the one of other portions of the flange 22. The ventilation passage 221 is formed in the thickened portion 221. Preferably, the flange 22 has two thickened portions 221 located at two opposite ends thereof. At least one ventilation passage 23 is formed in each thickened portion 221 so as to promote ventilation efficiency. However, as shown in FIG. 4, the flange 22' of the cover 20' has no thickened portion alternatively. Specifically, the whole flange 22' has a larger thickness so that the cover 20' has a larger external diameter than an external diameter of the container 10. The ventilation passage 23 is directly formed in the flange 22'.

Practically, when developing a plant seedling 4, as shown in FIG. 3, a culture medium 3 is placed into the receiving space 11, and then a seedling 4 is planted on the culture medium 3. Thereafter, the cover 20 is screwed with the container 10 for closing the opening. Preferably, the ventilation passage is filled with cotton fibers to prevent bacteria from entering the container. Due to the ventilation passage 23, the receiving space 11 communicates with external space so that air for the seedling growing can enter the receiving space 11 via the ventilation passage 23. In addition, the outward opening of the ventilation passage 23 faces downward, so dust in the air is prevented from falling into the receiving space 11. Also, membranes are not necessary for the present invention. Thus, the ventilation passage 23 is prevented from being blocked by dust. Besides, the container 10 and the cover 20 are both transparent so as to benefit observation by users and to benefit light entering.

Specifically, the present invention forms two ventilation passages to increase ventilation efficiency and convection. As a result, sterilizing before using becomes easier.

What is claimed is:

1. A culture container, including:
   a container, forming a receiving space therein, the container forming an opening at a top thereof wherein the opening communicates with the receiving space, an external threaded portion being formed on an external surface near a top of the container, the external threaded portion being arranged around the opening of the container;
   a cover, including a main body and a flange extending from the main body, a covering space being enclosed by the main body and the flange, an internal threaded portion corresponding to the external threaded portion of the container being formed on an internal surface of the flange, the cover being screwed with the container by the internal threaded portion and the external threaded portion so as to close the opening of the container, the cover forming a ventilation passage, the ventilation passage having a first opening and a second opening which are located at two ends of the ventilation passage, the first opening communicating with the covering space and the ventilation passage therebetween and being located between the main body and the internal threaded portion, the second opening being formed on a free end of the flange facing away from the main body, the flange being formed with a blocking flange inside the covering space, the blocking flange extending downward;
   wherein when the internal threaded portion of the cover is screwed with the external threaded portion of the container, a top portion of a wall of the container is clamped between the flange and the blocking flange to be abutted against by the blocking flange, the receiving space communicates with external space via the ventilation passage.

2. The culture container of claim 1, wherein the flange has at least one thickened portion, the thickened portion has a larger thickness than a thickness of other portions of the flange, the ventilation passage is formed in the thickened portion.

3. The culture container of claim 2, wherein the flange has two thickened portions which are located at two opposite ends of the flange, at least one ventilation passage is formed in each thickened portion.

4. The culture container of claim 1, wherein the cover is transparent.

* * * * *